United States Patent Office 2,819,298
Patented Jan. 7, 1958

2,819,298

PROCESS FOR THE MANUFACTURE OF CAROTENOIDS

Otto Isler, Marc Montavon, and Rudolf Rüegg, Basel, Switzerland, and Paul Zeller, Neuallschwil, near Basel, Switzerland, assignors to Hoffmann-La Roche Inc., Nutley, N. J., a corporation of New Jersey No Drawing. Application July 16, 1956
Serial No. 597,885

Claims priority, application Switzerland July 22, 1955

9 Claims. (Cl. 260—488)

The present invention relates to a process for the manufacture of carotenoids. This process comprises condensing acetylene at both ends by a metal-organic reaction with an 8-[2,6,6-trimethyl-cyclohexyliden]- or 8-[2,6,6 - trimethyl-cyclohexen - (1) - yl] - 2,6 - dimethyl-octatrien-(2,4,6)-al-(1) carrying a free or esterified hydroxy group in the nuclear 4-position (hereinafter referred to as substituted iso- or β-C$_{19}$-aldehyde), and subjecting the resulting 1,18-di-[2,6,6-trimethyl-cyclohexyliden]- or 1,18-di-[2,6,6-trimethyl-cyclohexen-(1)-yl]-3,7,12, 16 - tetramethyl - 8,11 - dihydroxy - octadecahexaen-(2,4,6,12,14,16)-yne-(9) in which both nuclei carry a free or esterified hydroxy group in the nuclear 4-position (hereinafter referred to as substituted iso- or β-C$_{40}$-diol), if desired after esterification, to a treatment causing elimination of two molecules of water or acid with allyl rearrangement, and, if desired, to alkaline saponification.

The starting materials required for this process can be prepared, e. g., as follows:

8 - [2,6,6 - trimethyl - 4 - acetoxy - cyclohexyliden] - 2,6-dimethyl - octatrien - (2,4,6) - al - (1)

By reacting β-isophorone with peracetic acid there is obtained hydroxy-isophorone which, upon oxidation with chromic acid, yields 2,6,6-trimethyl-cyclohexen-(2)-dione-(1,4). By reducing the latter with zinc in glacial acetic acid there is obtained 2,6,6-trimethyl-cyclohexan-dione-(1,4) which is ketalised at the keto group in 4-position by means of ethylene glycol and p-toluenesulphonic acid. The mono-ketal is reacted with the lithium salt of 3-methyl-3-hydroxy-4-methoxy-butyne-(1) (prepared by introducing 3-methyl-3-hydroxy-4-methoxy-butyne-(1) into a lithium amide suspension obtained from lithium and liquid ammonia) to form 4-[2,6,6-trimethyl - 4 - ethylendioxy - 1 - hydroxy - cyclohexyl]-2 - methyl - 2 - hydroxy - 1 - methoxy - butyne - (3) which is partially hydrogenated at the triple bond, boiled with formic acid and treated with glacial acetic acid and sodium acetate to form 4-[2,6,6-trimethyl-4-oxo-cyclohexyliden]-2-methylbuten-(2)-al-(1). By acetalisation of the latter with ethyl ortho-formate in the presence of ortho-phosphoric acid and a small amount of p-toluenesulphonic acid, reduction of the formed acetal with lithium-aluminum hydride and acetylation with acetic anhydride in the presence of pyridine there is obtained 4-[2,6,6 - trimethyl - 4 - acetoxy - cyclohexyliden] - 2-methylbuten - (2) - acetal - (1) which, upon condensation with vinyl ether in the presence of zinc chloride and hydrolysis with acetic acid and sodium acetate, yields 6 - [2,6,6 - trimethyl - 4 - acetoxy - cyclohexyliden] - 4-methyl - hexadien - (2,4) - al - (1). By acetalisation of the latter with ethyl ortho-formate in the presence of ortho-phosphoric acid and a small amount of p-toluenesulphonic acid, condensation of the resulting acetal with propenyl ether in the presence of zinc chloride and hydrolysis of the condensation product with acetic acid and sodium acetate there is obtained 8 - [2,6,6 - trimethyl - 4-acetoxy - cyclohexyliden] - 2,6 - dimethyl - octatrien-(2,4,6) - al - (1) in the form of a yellow tough resin; U. V. absorption maxima at 338, 354 and 372 mμ (in petroleum ether solution).

8 - [2,6,6 - trimethyl - 4 - hydroxy - cyclohexyliden]-2,6 - dimethyl - octatrien - (2,4,6) - al - (1)

This compound is obtained by boiling 8 - [2,6,6 - trimethyl - 4 - acetoxy - cyclohexyliden] - 2,6 - dimethyl-octatrien - (2,4,6) - al - (1) with sodium bicarbonate in 90% methanol. The thus obtained product has U. V. absorption maxima at 338, 354 and 372 mμ (in petroleum ether solution).

8 - [2,6,6 - trimethyl - 4 - acetoxy - cyclohexen - (1)-yl] - 2,6 dimethyl - octatrien - (2,4,6) - al - (1)

4 - [2,6,6 - trimethyl - 4 - oxo - cyclohexyliden] - 2-methylbuten - (2) - al - (1) is acetalised, reduced by means of lithium-aluminum hydride, and hydrolysed and acetylated with acetic acid. The resulting 4 - [2,6,6 - trimethyl - 4 - acetoxy - cyclohexyliden] - 2 - methylbuten - (2) - al - (1) is converted into the enol acetate by means of isopropenyl acetate, and the enol acetate is subjected to alkaline saponification and acetylated to form 4 - [2,6,6 - trimethyl - 4 - acetoxy - cyclohexen-(1) - yl] - 2 - methylbuten - (2) - al - (1). By acetalising the latter, condensing with vinyl ether and hydrolysing with acetic acid there is obtained 6 - [2,6,6 - trimethyl - 4 - acetoxy - cyclohexen - (1) - yl] - 4 - methyl-hexadien - (2,4) - al - (1) which, upon acetalisation condensation with propenyl ether and hydrolysis with acetic acid, yields 8 - [2,6,6 - trimethyl - 4 - acetoxy-cyclohexen - (1) - yl] - 2,6 - dimethyl - octatrien-(2,4,6) - al - (1).

8 - [2,6,6 - trimethyl - 4 - hydroxy - cyclohexen - (1)-yl] - 2,6 - dimethyl - octatrien - (2,4,6) - al - (1)

This compound is obtained by boiling 8 - [2,6,6 - trimethyl - 4 - acetoxy - cyclohexen - (1) - yl] - 2,6 - dimethyl - octatrien - (2,4,6) - al - (1) with sodium bicarbonate in 90% methanol. The thus obtained product has an U. V. absorption maximum at 312 mμ in petroleum ether solution.

In the first step of the process of the present invention acetylene is condensed at both ends thereof by a metal-organic reaction with the substituted iso- or β-C$_{19}$-aldehyde. To this end, acetylene di-magnesium halides, which may be prepared in a manner known per se from acetylene and alkyl-magnesium halides, can be condensed with the C$_{19}$-aldehyde by a Grignard reaction. The preferred starting materials are the C$_{19}$-aldehydes which carry an esterified hydroxy group in the nuclear 4-position. The present process can, however, also be carried out with aldehydes carrying a free hydroxy group in the nuclear 4-position; in this case an excess of the Grignard reagent must be used in view of the free hydroxy group. A convenient mode of operation consists in dissolving the substituted iso- or β-C$_{19}$-aldehyde in an inert solvent, such as diethyl ether or benzene, adding the resulting solution to a vigorously stirred suspension of the acetylene di-magnesium halide and agitating the mixture for several hours at room temperature or at the boiling temperature of the solvent. Upon hydrolysis of the condensation product, e. g. with ice-cold dilute sulphuric acid, there is obtained the substituted iso- or β-C$_{40}$-diol in the form of a tough resin which possesses absorption maxima in the U. V. spectrum at 310, 323.5 and 339 mμ and at 281.5 and 293 mμ, respectively, in petroleum ether.

A further mode of carrying out the first step of the present process consists in reacting the substituted iso- or β-C$_{19}$-aldehyde in liquid ammonia with an alkali or alkaline earth metal acetylide, such as lithium acetylide, and condensing the resulting condensation product, preferably after hydrolysing it to the substituted 10-[2,6,6-trimethyl-cyclohexyliden]- or 10-[2,6,6-trimethyl-cyclohexen-(1)-yl]-4,8-dimethyl-decatrien-(4,6,8)-yne-(1)-ol-(3), by a metal-organic reaction with a second mole of $C_{19}$-aldehyde to form the above described substituted iso- or $\beta$-$C_{40}$-diols.

In the second step of the process of the present invention the substituted iso- or $\beta$-$C_{40}$-diol, if desired after having been esterified, is subjected to a treatment causing splitting off of two molecules of water or acid with allyl rearrangement. This reaction can be carried out, e. g., by treating the iso- or $\beta$-$C_{40}$-diol in which both nuclei carry an esterified hydroxy group with phosphorus oxychloride in an inert solvent in the presence of excess pyridine, or by heating the substituted $C_{40}$-diol with a strong organic acid, such as p-toluenesulphonic acid, in toluene. The allyl rearrangement and the splitting off of water or acid can be made to take place simultaneously, e. g. by subjecting the substituted $C_{40}$-diol to the action of aqueous or anhydrous hydrohalic acid. Conveniently, the substituted $C_{40}$-diol is first esterified and subsequently two molecules of acid are split off from the esterified product. A suitable mode of carrying out this process step consists in treating a solution of the $C_{40}$-diol or of an ester thereof in an inert solvent, such as ether, methylene chloride or dioxane, with anhydrous hydrohalic acid. A small amount of acid is sufficient if the reaction is accelerated by heating. It is advantageous to effect the reaction in ethyl ether and to use an excess of alcoholic hydrochloric acid. Another suitable mode of operation consists in treating the $C_{40}$-diol or an ester thereof in a halogenated hydrocarbon solvent having a high dipole moment with aqueous hydrohalic acid at a temperature below 0° C. and then splitting off hydrogen halide from the resulting halo compound by the action of water or of a basic compound. Solvents which may be used for this purpose include methylene chloride and chloroform, and concentrated aqueous hydrobromic acid may be used as the aqueous hydrohalic acid. There is thus obtained 15,15-dehydro-$\beta$-carotene in which both nuclei carry a free or esterified hydroxy group (i. e. 15,15-dehydro-zeaxanthene or esters thereof). These products can be purified by distribution between solvents, chromatography or crystallisation. The esters of 15,15-dehydro-zeaxanthene can be saponified to 15,15-dehydro-zeaxanthene which can then be reconverted into esters thereof by esterification. The saponification is carried out in a manner known per se, e. g. by treatment with alkali metal hydroxides, carbonates or bicarbonates at room temperature or at elevated temperature in the presence of a diluent. The esterification is carried out by conventional methods, e. g. by treatment with acid halides or acid anhydrides in the presence of a tertiary organic base such as pyridine.

The products of the present process are crystalline compounds having absorption maxima in the ultra-violet spectrum at 430 and 458 m$\mu$ in petroleum ether. They are valuable intermediates for the synthesis of zeaxanthene and esters thereof. Thus, 15,15-dehydro-zeaxanthene or its esters can be partially hydrogenated at the triple bond and isomerized by heating the hydrogenated product in an inert solvent to form zeaxanthene or esters thereof.

The process above described, when starting from a substituted $\beta$-$C_{19}$-aldehyde, can be represented graphically by the following flow sheet I, wherein R represents hydrogen or lower alkanoyl:

FLOW SHEET I

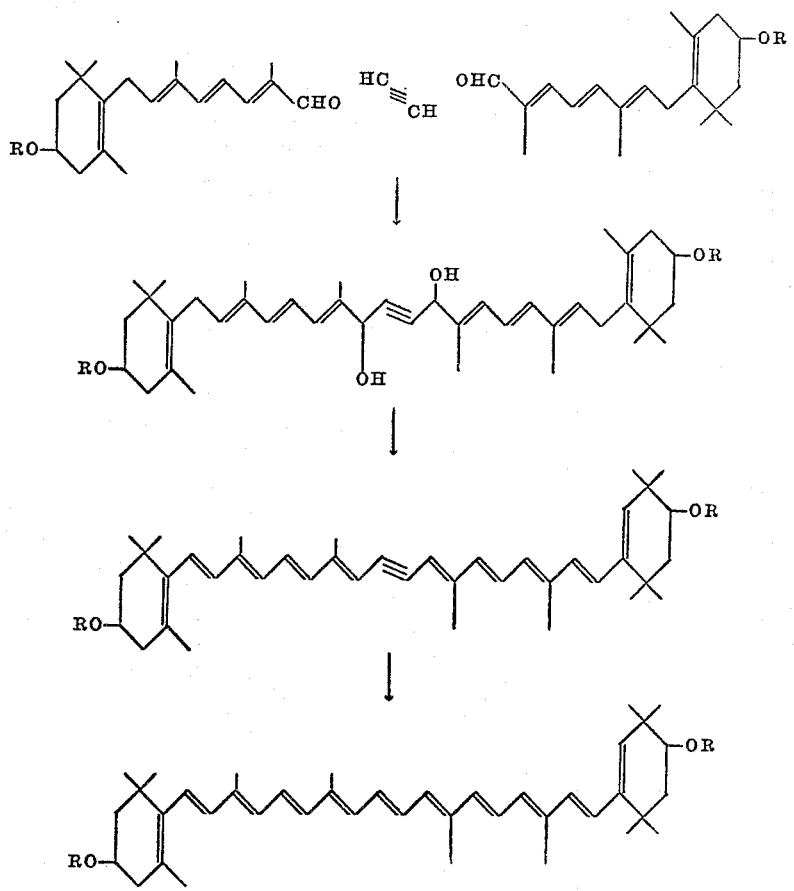

The process according to the present invention, when starting from a substituted iso-$C_{19}$-aldehyde, can be likewise represented by the following flow sheet II, wherein R represents hydrogen or lower alkanoyl:

FLOW SHEET II

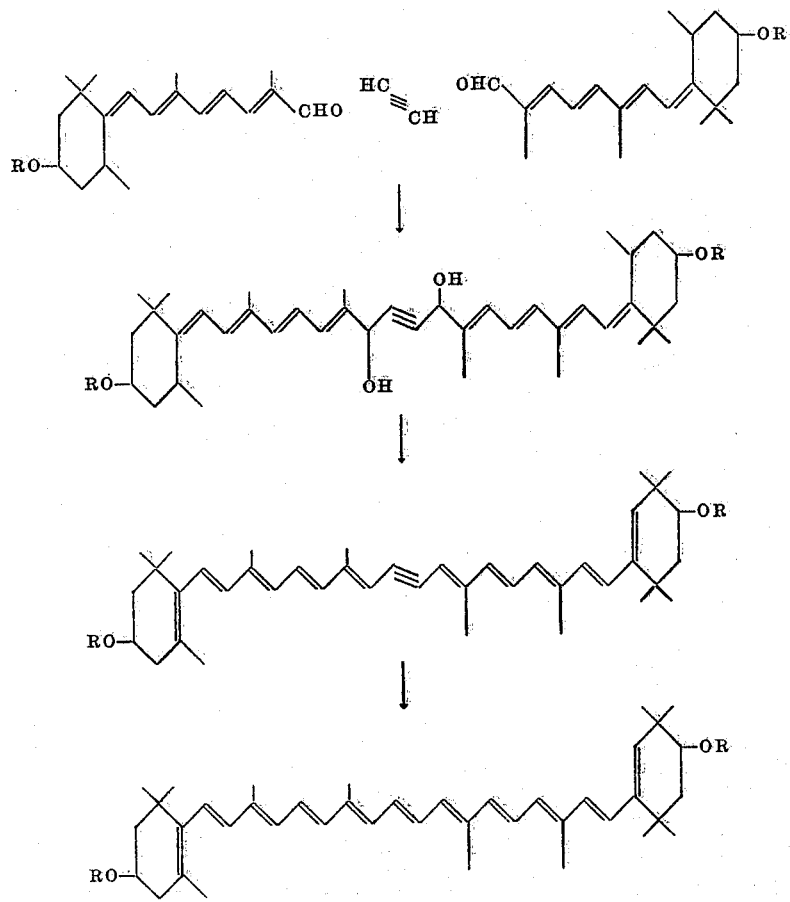

The invention will now be illustrated by the following examples, however without being limited thereto.

EXAMPLE 1

6.3 g. of 8-[2,6,6-trimethyl-4-acetoxy-cyclohexyliden]-2,6 - dimethyl - octatrien - (2,4,6) - al - (1) in 75 ml. of absolute benzene were rapidly added dropwise to a suspension of acetylene di-magnesium bromide prepared from 2.7 g. of magnesium 18.5 g. of hexyl bromide, 50 ml. of absolute ether and acetylene. The mixture was then heated at 60° C. for 3 hours, while stirring, in a nitrogen atmosphere. The reaction mixture was then poured into a mixture of ice water and a small amount of dilute sulphuric acid, and the product was extracted with ether. The ethereal solution was washed with dilute sodium bicarbonate solution and water, dried over sodium sulphate and concentrated. There were thus obtained 6.5 g. of condensation product (U. V. absorption maxima at 310 and 323.5 m$\mu$) which was further reacted without any preliminary purification. The product was dissolved in 115 ml. of methylene chloride and 4.3 ml. of glacial acetic acid, 4.6 ml. of 60% aqueous hydrobromic acid were added to the solution within 20 seconds at −40° C., the mixture was vigorously stirred for 1.5 minutes at −35° C., then 115 ml. of water were added thereto, and the mixture was stirred for a further 3 hours at 0° C. The methylene chloride solution was then washed with dilute sodium bicarbonate solution and water, dried over sodium sulphate and concentrated. The residue was shaken with 60 ml. of ether, 100 ml. of methanol and 10 g. of potassium hydroxide for 12 hours at room temperature. The mixture was diluted with water, and the ethereal solution was washed three times with water. The crude product obtained by drying the ethereal solution and evaporating the ether was subjected to chromatography on a column of 500 g. of alumina (according to Wölm; activity state I+4% of water). The 15,15-dehydro-zeaxanthene was eluted with a mixture of equivalent parts of methylene chloride and petroleum ether (boiling range 30–60° C.), and then recrystallised by dissolving it in methylene chloride and adding petroleum ether (boiling range 70–100° C.) to the solution while continuously evaporating the methylene chloride. The resulting product melted at 207–208° C. and showed U. V. absorption maxima at 430 and 458 m$\mu$ ($E_{1\,cm.}^{1\%}$=1923 and 1587)

The 8 - [2,6,6-trimethyl - 4 - acetoxy - cyclohexyliden]-2,6-dimethyl-octatrien-(2,4,6)-al-(1) used as starting material in this example may be prepared as follows:

138 g. of 2,6,6 - trimethyl - 1 - cyclohexen - 4 - one [which can be made, for example, from isophorone by known procedures; compare Karash, Journal of the American Chemical Society, 63, 2308 (1941)] in 50 ml. of glacial acetic acid was stirred for two hours at 0–10° C. with 160 ml. of peracetic acid (containing 530 mg. of peracetic acid per ml.) and the mixture was allowed to stand overnight at 20° C. Then, while adding ice, the reaction mixture was made weakly alkaline (pH about 8) by adding 30% aqueous NaOH solution, and the reaction mixture was shaken for one hour at 20° C. Then the mixture was extracted twice, each time with 800 ml. of diethyl ether, and the ether solutions were washed once with 200 ml. of saturated ammonium chloride solution. The ether solutions were combined and dried over sodium sulfate, the solvent was driven off, and the residue was distilled in high vacuum. A forerun passed over between 70 and 80° C., and then 2,6,6-trimethyl-2-cyclohexen-1-ol-4-one was obtained as an almost colorless oil having B. P. 110–112° C./0.1 mm., $n_D^{20}$=1.501, U. V. maximum at 226 m$\mu$ ($E_1^1$=1110 in petroleum ether solution), after standing for some time. The phenylsemicarbazone had M. P. 189–190°, U. V. maxima at 240.5 mμ and 285 mμ ($E_1^1$=807 and 778 in ethanol).

To 154 g. of 2,6,6-trimethyl-2-cyclohexen-1-ol-4-one in 200 ml. of glacial acetic acid and 500 ml. of water was quickly added dropwise 70 g. of chromic anhydride in 200 ml. of water, while stirring and cooling, so that the temperature did not rise above 30° C. The mixture was then stirred overnight at 20° C. Then the reaction mixture was saturated with ammonium chloride and was extracted with 1000 ml. of petroleum ether (boiling range 30–60° C.). The aqueous layer was again extracted in a second separatory funnel with 500 ml. of petroleum ether. The petroleum ether solutions were washed with saturated ammonium chloride solution to which a little ammonia had been added, and then with pure saturated ammonium chloride solution. The washed extracts were dried over sodium sulfate and the solvent was driven off. The product, 2,6,6-trimethyl-2-cyclohexene-1,4-dione, was distilled under a water pump vacuum; B. P. 92–94° C./11 mm., a yellow oil which solidified to crystalline form in the refrigerator, $n_D^{21}$=1.490, U. V. maximum at 238 mμ ($E_1^1$=942 in petroleum ether). The phenylsemicarbazone had M. P. 190° C., then resolidified and melted again at 230° C., U. V. maxima at 242.5 mμ and 325.5 mμ ($E_1^1$=875 and 580 in ethanol).

65 g. of 2,6,6-trimethyl-2-cyclohexen-1,4-dione in 250 ml. of glacial acetic acid was slowly reacted with 130 g. of zinc dust, while stirring, so that the temperature did not rise above 50° C. Then the reaction mixture was stirred for an additional period of one hour. The reaction mixture was filtered, diluted with 1000 ml. of water and then saturated with ammonium chloride. The mixture was extracted twice, each time with 800 ml. of petroleum ether (boiling range 30–60° C.). The petroleum ether solutions were washed with 300 ml. of saturated ammonium chloride solution to which some ammonia was added, and then were washed with pure saturated ammonium chloride solution. (In case a portion of the product crystallizes from the petroleum ether solution, it is filtered off, the crystalline material is dissolved in diethyl ether, then the diethyl ether solution is washed as indicated above, dried over sodium sulfate and then combined with the petroleum ether solution.) The solvent was driven off until the product 2,6,6-trimethyl-1,4-cyclohexanedione started to crystallize out; colorless needles, M. P. 63–65° C., having no absorption maximum in the ultraviolet spectrum between 220 and 280 mμ. The phenylsemicarbazone had M. P. 218–220° C., U. V. maximum at 250 mμ ($E_1^1$=1030 in ethanol).

34.6 g. of 2,6,6-trimethyl-1,4-cyclohexanedione, 100 ml. of benzene, 19 g. of ethylene glycol and 0.2 g. of p-toluenesulfonic acid were refluxed for seven hours while separating the water which was formed. Upon cooling, the reaction mixture was poured into 300 ml. of 5% sodium bicarbonate solution, and the 2,6,6 - trimethyl - 4 - ethylenedioxy - 1 - cyclohexanone product was obtained by extraction with diethyl ether and distillation of the extract. The product was obtained as a colorless oil, having B. P. 70° C./0.02 mm., $n_D^{21}$=1.469.

To a lithium amide suspension prepared by dissolving 6.7 g. of lithium in 2000 ml. of liquid ammonia was added slowly, while stirring, 52 g. of 1-methoxy-2-methyl-3-butyn-2-ol. The mixture was stirred for one hour and then 79 g. of 2,6,6 - trimethyl - 4 - ethylenedioxy - 1 - cyclohexanone was added, and the reaction mixture was stirred overnight at the boiling temperature of the ammonia. 60 g. of ammonium chloride was added and then the ammonia was driven off. The residue was taken up in diethyl ether, and insoluble material was filtered off; the ether solution was washed with a saturated solution of ammonium chloride, then was dried over sodium sulfate, and the ether was driven off. The residue was suspended in 450 ml. of petroleum ether and was extracted four times, each time with 300 ml. of 70% methanol. The methanol extracts were washed three times, each time with 150 ml. of petroleum ether, then were diluted with saturated ammonium chloride solution and the precipitated material was taken up in diethyl ether. The ether solution was washed with water, dried over sodium sulfate, and the ether was driven off. There was thus obtained 92 g. of 4 - (2,6,6 - trimethyl - 4 - ethylenedioxy - 1 - hydroxy - 1 - cyclohexyl) - 2 - methyl - 1 - methoxy - 3 - butyn - 2 - ol as a yellow, viscous oil.

92 g. of the latter was dissolved in 3000 ml. of dry diethyl ether, was mixed while stirring at 0–5° C. with a solution of 22.5 g. of lithium aluminum hydride in 300 ml. of dry diethyl ether, and the reaction mixture was refluxed for four hours. Then the reaction mixture was cooled with ice, 250 ml. of methanol was added slowly while stirring at 0–5° C., and the clear solution was poured into a mixture of 100 g. of ice and 600 ml. of saturated ammonium chloride solution. The precipitated aluminum hydroxide was filtered off and the precipitate was washed with diethyl ether and added to the filtrate. The combined liquors were washed with water, dried over sodium sulfate and the solvents were driven off. The residue was partitioned between petroleum ether and 70% methanol, in the manner indicated above, and from the methanol extracts there was obtained 70 g. of 4 - (2,6,6 - trimethyl- 4 - ethylenedioxy - 1 - hydroxy - 1 - cyclohexyl) - 2 - methyl - 1 - methoxy - 3 - buten - 2 - ol as a light yellow, viscous oil.

70 g. of the latter was mixed with 140 ml. of formic acid and the mixture was heated for 25 minutes at 100° C. The reaction mixture was poured onto ice and extracted with diethyl ether, the ethereal solution was washed with water and with dilute sodium bicarbonate solution, dried over sodium sulfate, and the ether was driven off. The residue was dissolved in 200 ml. of glacial acetic acid, 26 ml. of water and 32 g. of sodium acetate were added, and the mixture was heated at 95° C. for two hours. Then it was diluted with ice water, and was extracted with diethyl ether, the ether extract was washed with water and with dilute sodium bicarbonate solution, dried over sodium sulfate and the ether was driven off. The residue was distilled in vacuum, thereby yielding 4 - (2,6,6 - trimethyl- 4 - oxo - 1 - cyclohexyliden) - 2 - methyl - 2 - buten - 1 - al as a yellow oil having B. P. ca. 110° C./0.02 mm., $n_D^{21}$=1.555 (U. V. maximum at 284 mμ in petroleum ether).

A solution of 31 g. of 4 - (2,6,6 - trimethyl - 4 - oxo - 1 - cyclohexylidene) - 2 - methyl - 2 - buten - 1 - al in 34 ml. of orthoformic acid ethyl ester and 7 ml. of absolute ethanol was mixed with 0.65 ml. of orthophosphoric acid and 0.05 g. of p-toluenesulfonic acid, and the mixture was allowed to stand for 24 hours at room temperature. 7 ml. of pyridine was added and then the mixture was poured upon ice and dilute sodium bicarbonate solution, the resulting mixture was extracted with petroleum ether, the petroleum ether extract was washed with water, dried over sodium sulfate, the solvent was driven off and the residue was dried in vacuo at 60° C. There was thus obtained 40 g. of 4 - (2,6,6 - trimethyl - 4 - oxo - 1 - cyclohexyliden)- 2 - methyl - 1,1 - diethoxy - 2 - butene (U. V. maximum at 248 mμ in petroleum ether).

40 g. of the latter product was dissolved in 600 ml. of dry diethyl ether and was mixed slowly, while stirring at 0–5° C., with a solution of 2.8 g. of lithium aluminum hydride in 40 ml. of diethyl ether. The reaction mixture was stirred for one hour at room temperature, then was cooled to 0–5° C.; 20 ml. of methanol was added slowly, and the reaction mixture was poured upon ice and saturated ammonium chloride solution. The precipitated aluminum hydroxide was filtered off and washed with diethyl ether, the ether was added to the filtrate, the combined liquors were dried over sodium sulfate and the solvent material was driven off. There was obtained 39.5 g. of 4 - (2,6,6 - trimethyl - 4 - hydroxy - 1 - cyclohexyliden)- 2 - methyl - 1,1 - diethoxy - 2 - butene.

39.5 g. of the latter was acetylated by mixing it with 40 ml. of pyridine and 20 ml. of acetic anhydride and permitting the mixture to stand for 20 hours. The reaction mixture was poured into ice water, extracted with petroleum ether, the organic layer was washed with cold sodium bicarbonate solution, dried over sodium sulfate and the solvent was driven off, yielding 42 g. of 4 - (2,6,6 - trimethyl-4 - acetoxy - 1 - cyclohexyliden) - 2 - methyl - 1,1 - diethoxy - 2 - butene.

42 g. of the latter was mixed with 400 ml. of glacial acetic acid, 50 ml. of water and 65 g. of sodium acetate and heated at 95° C. for three hours. Then the reaction mixture was diluted with ice water and was extracted with diethyl ether. The ethereal solution was washed several times with water, dried over sodium sulfate and the ether was driven off. There was thus obtained 31 g. of 4-(2,6,6-trimethyl-4-acetoxy-1-cyclohexyliden)-2-methyl-2-buten-1-al (U. V. maximum at 284 m$\mu$ in petroleum ether).

To a solution of 7.3 g. of 4-[2,6,6-trimethyl-4-acetoxy-cyclohexyliden]-2-methyl-buten-(2)-al-(1) in 6.8 ml. of ethyl ortho-formate there was added a solution of 0.13 ml. of ortho-phosphoric acid in 1.3 ml. of absolute ethanol, and after the addition of 0.005 g. of p-toluene-sulfonic acid the reaction mixture was allowed to stand at room temperature for 24 hours. Then 1.5 ml. of pyridine were added, and the reaction mixture was poured into a mixture of 100 g. of 5% sodium bicarbonate solution and 20 g. of ice. The product was taken up in ether, and the ether extract was shaken with sodium bicarbonate solution and dried over sodium sulfate. After evaporation of the ether, the residue was freed from excess ethyl orthoformate in a high vacuum at 50° C. There were thus obtained 7.9 g. of acetal ($n_D^{25}$=1.4965; U. V. absorption maximum at 246 m$\mu$ in petroleum ether solution) which was further processed without any purification. The acetal was dissolved in 10 ml. of petroleum ether (B. P. 30–60° C.), 1.4 ml. of a 10% solution of zinc chloride in ethyl acetate were added to the solution, and then 1.9 g. of vinyl ethyl ether in 2 ml. of petroleum ether (B. P. 30–60° C.) were slowly added dropwise, while stirring and maintaining the temperature below 30° C. The reaction mixture was then allowed to stand at room temperature for 20 hours. Thereupon, the petroleum ether was removed at 30° C. in the vacuum of a water jet pump, and 20 ml. of glacial acetic acid, 1 ml. of water and 2 g. of sodium acetate (cryst.) were added to the residue. The mixture was heated at 95° C. for 3 hours in a carbon dioxide atmosphere. After cooling, the solution was poured into 200 ml. of water, and the product was extracted with ether. The ether solution was washed several times with water and then with dilute sodium bicarbonate solution. Upon drying of the ether solution over sodium sulfate and evaporation of the ether, there were obtained 6.7 g. of 6 - [2,6,6 - trimethyl - 4 - acetoxy - cyclohexyliden] - 4-methyl-hexadien-(2,4)-al-(1) as a yellow viscous oil; U. V. absorption maxima at 319 and 330 m$\mu$ (in petroleum ether solution). The product can be purified by chromatographic adsorption on alumina (according to Brockmann, activity state II). The phenyl semicarbazone of the obtained aldehyde has absorption maxima in the U. V. spectrum at 237, 340 and 356 m$\mu$ (in petroleum ether solution).

To a solution of 4.5 g. of 6-[2,6,6-trimethyl-4-acetoxy-cyclohexyliden]-4-methyl-hexadien-(2,4)-al-(1) in 4 ml. of ethyl orthoformate there was added a mixture of 0.75 ml. of absolute alcohol and 0.075 ml. of orthophosphoric acid, and after the addition of 0.003 g. of p-toluenesulfonic acid the reaction mixture was allowed to stand at room temperature for 24 hours. Then 1 g. of pyridine was added, and the reaction mixture was poured into a mixture of 100 g. of 5% sodium bicarbonate solution and 10 g. of ice. The product was extracted with ether, and the ether solution was washed with water. After drying the ether solution over sodium sulfate and evaporation of the ether, the residue was freed from excess ethyl orthoformate in a high vacuum at 50° C. There were thus obtained 4.85 g. of acetal; U. V. absorption maxima at 286.5 and 297.5 m$\mu$ in petroleum ether solution. The acetal was dissolved, without any further purification, in 7 ml. of absolute benzene, 1 ml. of a 10% solution of zinc chloride in ethyl acetate was added to the solution, and then 1.2 g. of propenyl ethyl ether in 2 ml. of absolute benzene were added dropwise, while stirring and maintaining the temperature below 30° C. The reaction mixture was then further stirred overnight at room temperature. The benzene was then removed at 30° C. in the vacuum of a water jet pump, and 20 ml. of glacial acetic acid, 1 ml. of water and 2 g. of sodium acetate were added to the residue. The mixture was heated at 95° C. for 3 hours in a carbon dioxide atmosphere. After cooling, the solution was poured into 200 ml. of water, and the reaction product was extracted with ether. The ether solution was washed several times with water and then with dilute sodium bicarbonate solution. Upon drying of the ether solution over sodium sulfate and evaporation of the ether, there were obtained 4.5 g. of 8-[2,6,6-trimethyl-4-acetoxy-cyclohexyliden]-2,6-dimethyl-octatrien-(2,4,6)-al-(1) in the form of a yellow tough resin; U. V. absorption maxima at 338, 354 and 372 m$\mu$ (in petroleum ether solution). This product can be purified by chromatography on alumina (according to Brockmann, activity state II).

EXAMPLE 2

6.3 g. of 8-[2,6,6-trimethyl-4-acetoxy-cyclohexen-(1)-yl]-2,6-dimethyl-octatrien-(2,4,6)-al-(1) were treated in the manner described in Example 1. There was thus obtained 15,15-dehydro-zeaxanthene of M. P. 207–208° C.

The 8-[2,6,6-trimethyl-4-acetoxy-cyclohexen-(1)-yl]-2,6-dimethyl-octratrien-(2,4,6)-al-(1) used as starting material in this example was prepared as follows:

31 g. of 4-(2,6,6-trimethyl-4-acetoxy-1-cyclohexylidene)-2-methyl-2-buten-1-al (prepared according to Example 1 above) was dissolved in 40 ml. of toluene, mixed with 16 g. of isopropenyl acetate and 0.2 g. of p-toluene-sulfonic acid and the mixture was heated at 120–140° C. while continuously removing the acetone which was formed. After approximately two hours, the reaction mixture was cooled down, poured into ice water and extracted with petroleum ether. The petroleum ether solution was washed with cold sodium bicarbonate solution and then with water, dried over sodium sulfate and the solvent was distilled off. There was thus obtained 34 g. of 4-(2,6,6-trimethyl-4-acetoxy-1-cyclohexen-1-yl)-2-methyl-1-acetoxy1,3-butadiene (U. V. maximum at 262 m$\mu$ in petroleum ether).

34 g. of the latter was dissolved in 750 ml. of methanol, mixed with 75 ml. of water and 27 g. of sodium bicarbonate and the mixture was refluxed for six hours while stirring. Then the reaction mixture was diluted with ice water, extracted with diethyl ether, the ether solution was washed with water, dried over sodium sulfate and the ether was driven off. In order to insure acetylation of the nuclear hydroxy group, the residue, presumably containing at least some 4-(2,6,6-trimethyl-4-hydroxy-1-cyclohexen-1-yl)-2-methyl-2-buten-1-al, was mixed with 60 ml. of pyridine and 30 ml. of acetic anhydride and the mixture was allowed to stand for 20 hours at room temperature. 100 ml. of ice water was added and the mixture was then extracted with diethyl ether. The ethereal solution was washed with cold sodium bicarbonate solution and then with water, dried over sodium sulfate and the solvent was driven off. The 4-(2,6,6-trimethyl - 4 - acetoxy - 1 - cyclohexen - 1 - yl) - 2-methyl-2-buten-1-al thus obtained can be purified by chromatography and partitioning between solvents; U. V. maximum at 232 m$\mu$ in ethanol.

7.3 g. of 4-[2,6,6-trimethyl-4-acetoxy-cyclohexen-(1)-yl]-2-methyl-buten-(2)-al-(1) were treated in the manner described in Example 1. There were thus obtained 6.8 g. of 6-[2,6,6-trimethyl-4-acetoxy-cyclohexen-(1)-yl]-4-methyl-hexadien-(2,4)-al-(1) in the form of a viscous, yellowish oil; U. V. absorption maximum at 273–275 m$\mu$ (in petroleum ether solution). The phenyl semicarbazone of the obtained aldehyde, crystallised from ethyl acetate in almost colorless needles (M. P. 190° C.); U. V. absorption maxima at 234 and 304 m$\mu$ (in petroleum ether).

4.5 g. of 6-[2,6,6-trimethyl-4-acetoxy-cyclohexen-(1)-yl]-4-methyl-hexadien-(2,4)-al-(1) were treated in the manner described in Example 1. There were thus obtained 6.5 g. of 8-[2,6,6-trimethyl-4-acetoxy-cyclohexen-(1)-yl]-2,6-dimethyl-octatrien-(2,4,6)-al-(1) in the form of a yellow oil; U. V. absorption maximum at 310 m$\mu$ (in petroleum ether solution). The phenyl semicarbazone of the obtained aldehyde melted at 192–193° C., after recrystallisation;

$E_{1\,cm.}^{1\%}$ at 232 m$\mu$: 355

$E_{1\,cm.}^{1\%}$ at 332 m$\mu$: 1575 and $E_{1\,cm.}^{1\%}$ at 346 m$\mu$: 1505

We claim:

1. Process for the manufacture of carotenoids which comprises condensing acetylene at both ends by a metalorganic reaction with an aldehyde selected from the group consisting of 8-[2,6,6-trimethyl-4-R-cyclohexyliden]-2,6-dimethyl - octatrien - (2,4,6) - al - (1) and 8 - [2,6,6 - trimethyl - 4 - R - cyclohexen - (1) - yl] - 2,6 - dimethyl-octatrien-(2,4,6)-al-(1) wherein R represents a radical of the group consisting of hydroxy and lower alkanoyloxy, and subjecting the resulting condensation product of the group consisting of 1,18-di-[2,6,6-trimethyl-4-R-cyclohexyliden] - 3,7,12,16 - tetramethyl - 8,11 - dihydroxy-octadecahexaen-(2,4,6,12,14,16)-yne-(9) and 1,18-di - (2,6,6 - trimethyl - 4 - R - cyclohexen - (1) - yl]-3,7,12,16 - tetramethyl - 8,11 - dihydroxy - octadecahexaen-(2,4,6,12,14,16)-yne-(9) wherein R has the same meaning as above to a treatment with a hydrohalic acid in an inert solvent thereby causing elimination of two molecules of water with allyl rearrangement.

2. Process as claimed in claim 1, wherein R represents lower alkanoyloxy.

3. Process as claimed in claim 1, wherein R represents acetoxy.

4. Process as claimed in claim 1 which comprises treating the resulting condensation product in ethyl ether with alcoholic hydrochloric acid.

5. 1,18 - di - [2,6,6 - trimethyl - 4 - R - cyclohexyliden]-3,7,12,16 - tetramethyl - 8,11 - dihydroxy - octadecahexaen-(2,4,6,12,14,16)-yne-(9) wherein R represents a radical of the group consisting of hydroxy and lower alkanoyloxy.

6. 1,18 - di - [2,6,6 - trimethyl - 4 - R - cyclohexen-(1)-yl] - 3,7,12,16 - tetramethyl - 8,11,dihydroxy - octadecahexaen-(2,4,6,12,14,16)-yne-(9) wherein R represents a radical of the group consisting of hydroxy and lower alkanoyloxy.

7. 15,15-dehydro-zeaxanthene.

8. Di - (lower alkanoylated) - 15,15 - dehydro - zeaxanthene.

9. 15,15-dehydro-zeaxanthene di-acetate.

References Cited in the file of this patent

UNITED STATES PATENTS

| | | |
|---|---|---|
| 2,671,112 | Inhoffen et al. | Mar. 2, 1954 |
| 2,730,549 | Isler et al. | June 10, 1956 |

U. S. DEPARTMENT OF COMMERCE
PATENT OFFICE

CERTIFICATE OF CORRECTION

Patent No. 2,819,298                                                                  January 7, 1958

Otto Isler et al.

It is hereby certified that error appears in the printed specification of the above numbered patent requiring correction and that the said Letters Patent should read as corrected below.

Column 2, line 66, for "339" read -- 339.5 --; column 5, line 49, for "magnesium 18.5" read -- magnesium, 18.5 --; column 10, line 53, for "acetoxyl,3" read -- acetoxy-1,3 --.

Signed and sealed this 11th day of March 1958.

(SEAL)
Attest:
KARL H. AXLINE                                              ROBERT C. WATSON
Attesting Officer                                     Commissioner of Patents